United States Patent
Holloway et al.

(12) 
(10) Patent No.: US 6,633,051 B1
(45) Date of Patent: Oct. 14, 2003

(54) SURFACE SENSING DEVICE WITH OPTICAL SENSOR

(75) Inventors: Alan J Holloway, Wotton-under-Edge (GB); Kevyn B Jonas, Edinburgh (GB); David A Wright, Edinburgh (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/701,699

(22) PCT Filed: Apr. 6, 2000

(86) PCT No.: PCT/GB00/01303

§ 371 (c)(1),
(2), (4) Date: Dec. 1, 2000

(87) PCT Pub. No.: WO00/60310

PCT Pub. Date: Oct. 12, 2000

(30) Foreign Application Priority Data

Apr. 6, 1999 (GB) .............................................. 9907644

(51) Int. Cl.⁷ .............................................. G01N 21/86
(52) U.S. Cl. .............................. 250/559.29; 250/559.44; 250/227.13; 33/503
(58) Field of Search ....................... 250/559.29, 559.33, 250/559.4, 559.44, 227.11, 227.13, 216; 33/503, 556.2, 559

(56) References Cited

U.S. PATENT DOCUMENTS

| 4,574,199 | A | | 3/1986 | Pryor |
| 4,839,526 | A | * | 6/1989 | Pryor ...................... 250/559.4 |
| 5,103,572 | A | | 4/1992 | Ricklefs |
| 5,118,956 | A | | 6/1992 | Dunning et al. |
| 5,353,514 | A | * | 10/1994 | McMurtry ................... 33/559 |

FOREIGN PATENT DOCUMENTS

| DE | 42 44 240 A1 | 6/1994 |
| EP | 0 360 853 B1 | 4/1990 |

* cited by examiner

*Primary Examiner*—Kevin Pyo
(74) *Attorney, Agent, or Firm*—Oliff & Berridge, PLC (57) ABSTRACT

A surface sensing device includes an articulating head adapted for attachment to the spindle of a measuring machine and having two relatively rotatable parts capable of rotation about two mutually perpendicular axes. The device additionally includes a stylus assembly having a relatively stiff hollow stylus carrier, and a relatively flexible hollow stylus. An optical transducer system is provided within the stylus assembly and comprises a fixed light source which directs a beam of light towards a stylus tip, and a retro-reflective component at the tip which reflects the beam back to a fixed detector. The arrangement is such that lateral displacement of the stylus tip when the tip is in contact with a surface can be measured directly.

17 Claims, 3 Drawing Sheets

SURFACE SENSING DEVICE WITH OPTICAL SENSOR

BACKGROUND OF THE INVENTION

1. Field of Invention

The present invention relates to a surface sensing device for use in position determining apparatus such as for example, a coordinate measuring machine (CMM), a scanning machine or robot.

2. Description of Related Art

Coordinate measuring machines are used for measuring workpieces, and typically comprise an arm movable in three directions x, y and z relative to a table on which the workpiece is supported. Movements of the arm in each of the x, y and z directions are measured by transducers on the machine, so that the position of the arm relative to a datum position can be determined.

The surface sensing device may comprise a touch trigger probe, or an analogue or measuring probe, and in each case includes a stylus assembly having an elongate stylus with a workpiece-contacting tip.

The surface sensing device with which the invention is particularly concerned is an analogue device for mounting on an articulating head, and suitable for use in a high speed scanning operation.

An articulating head is known per se for example from European Patent No. 360853. The head is capable of rotating the axis of a stylus assembly mounted on it about two orthogonal axes. In use, the head is mounted on the arm of the machine with one of its axes aligned with the axis of the arm. Transducers associated with each of the rotatable axes of the head determine the orientation of the axis of the stylus assembly relative to the axis of the arm of the machine.

During a scanning operation the machine and/or the head cause the stylus tip to move over the surface of a workpiece, in accordance with instructions from the machine controller, to gather data about the profile of the workpiece surface.

From the signals provided by the measuring transducers of the machine and head, and from knowledge of the dimensions of the parts of the surface sensing device, a prediction can be made about the position of the centre of the stylus tip.

However, the stylus assembly is subject to bending due to contact with the workpiece surface and due to inertial forces while accelerating, and this bending makes the actual position of the centre of the stylus tip uncertain.

One way of reducing the uncertainty is to make the stylus assembly stiffer. However this adds weight to the stylus which is a disadvantage, particularly for a high speed scanning operation.

Also, in a scanning operation it is essential to provide some means of knowing that the stylus tip is on the surface. Prior scanning systems have detected the bending of the stylus assembly for this purpose, and also in an attempt to determine the deflection of the stylus tip caused by the bending.

Examples of stylus assemblies in which transducers are used to determine when a stylus has been deflected are described in the patent specifications set out below.

In European Patent No. 360853 strain gauges are attached to the stylus to measure the actual bending of the stylus from which an estimate of the stylus tip deflection can be made.

Similarly in U.S. Pat. No. 5,118,956 the strain in a fibre within the stylus is measured by an interferometric method, and stylus deflection can be estimated from this measurement.

Another example of detecting stylus deflection to determine that the stylus has contacted a workpiece is described in U.S. Pat. No. 5,103,572. This patent describes the use in a trigger probe, of a laser resonator, the external reflector for which is attached to the stylus tip. Deflection of the tip by contact with the workpiece causes a change in the resonator quality which can be detected.

SUMMARY OF THE INVENTION

None of the methods described in the above patents are capable of giving a direct measure of the lateral displacement of the stylus tip due to stylus bending. U.S. Pat. No. 4,574,199 discloses an optical contact sensor in which a light source in a stylus ball creates an image of an aperture on a detector array so that when the stylus ball contacts a surface the image of the aperture moves across the detector.

The requirement to put a light source in the stylus ball is impractical with small diameter styli and requires electrical power connections to be positioned in the stylus which is an inconvenience.

The present invention in one of its aspects provides a surface sensing device which includes a transducer system which enables the lateral displacement of the stylus tip to be measured directly at or near the centre of the stylus tip.

In a preferred embodiment of the invention the transducer system is an optical system including a light source which directs a light beam along the length of the stylus towards the stylus tip, and a position sensitive detector positioned to receive the beam and to produce a signal indicative of the amount of lateral displacement of the stylus tip due to bending of the stylus. The optical system preferably comprises a retro-reflective component positioned at or near the centre of the stylus tip, the position sensitive detector and the light source being positioned at the opposite end of the stylus.

In order to be suitable for use in a high speed scanning operation the stylus assembly of the surface sensing device according to the present invention is preferably lightweight and relatively stiff so that its natural frequency of vibration is high enough not to be excited by vibrations of the machine on which it is mounted. At the same time, as described above, it is important to have some flexibility in order to be able to detect that the stylus is in contact with the workpiece.

However, since the transducer system according to a first aspect of the invention is capable of measuring the actual displacement of the centre of the stylus tip, the apparently conflicting requirements that the stylus assembly should have relatively high stiffness and yet still have flexibility, can be resolved in accordance with further novel aspects of the present invention with some advantageous results.

In another novel aspect of the invention the stylus assembly of the surface sensing device comprises a relatively stiff stylus carrier to which a relatively flexible stylus is attached. The combination is such as to provide overall the required high natural frequency of vibration, while the relatively flexible stylus, is made as small and as light as possible.

Thus in a preferred embodiment the stylus carrier has a conical or curved trumpet shape which can be designed to provide high stiffness to prevent bending during a scanning operation. The flexibility and low mass of the stylus are achieved by keeping its diameter as small as is practically possible.

Since the uncertainty which might have been introduced by allowing greater stylus deflections has been substantially eliminated by measuring the lateral displacement of the stylus tip directly, the flexibility of the stylus itself can be maximised to reduce the scanning torque required to be produced by the articulating head.

Also because the sensing system in the stylus produces signals indicative of the amount of lateral displacement of the stylus tip, in accordance with another aspect of the invention, these signals can be passed to a servo system in the controller to servo the articulating head. The controller can thus ensure that the stylus tip remains on the surface of the workpiece, and that the bending of the stylus remains within acceptable limits to minimise the chance of damage to the stylus. The higher natural frequency of the stylus assembly also allows servoing of the head at a higher rate.

BRIEF DESCRIPTION OF THE DRAWINGS

Examples of the invention will now be described with reference to the accompanying drawings in which.

DETAILED DESCRIPTION OF THE PREFERRED EMBODIMENTS

Figure 1:
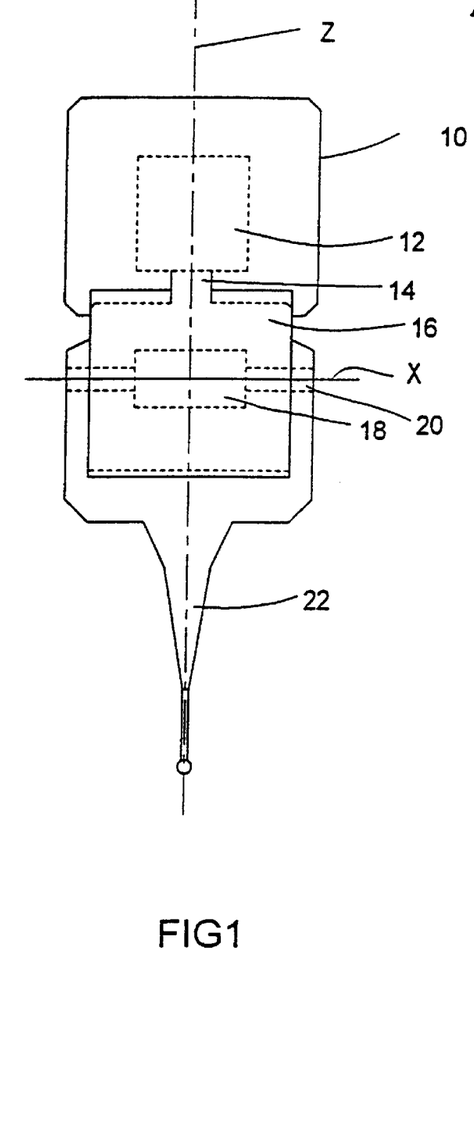
FIG. 1 is a diagrammatic representation of an articulating head with a surface sensing device of the present invention.

Referring now to FIG. 1 there is shown an articulating probe head. The head comprises a first housing part 10 adapted for attachment to a position determining apparatus (not shown), and which contains a motor 12 to provide rotation of a shaft 14 about a first axis z. Attached to the shaft is a second housing part 16 which contains a second motor 18 to provide rotation of a second shaft 20 about a second axis x. Attached to the second shaft for rotation therewith is a surface sensing device which includes a support for a stylus assembly 22.

Figure 2:
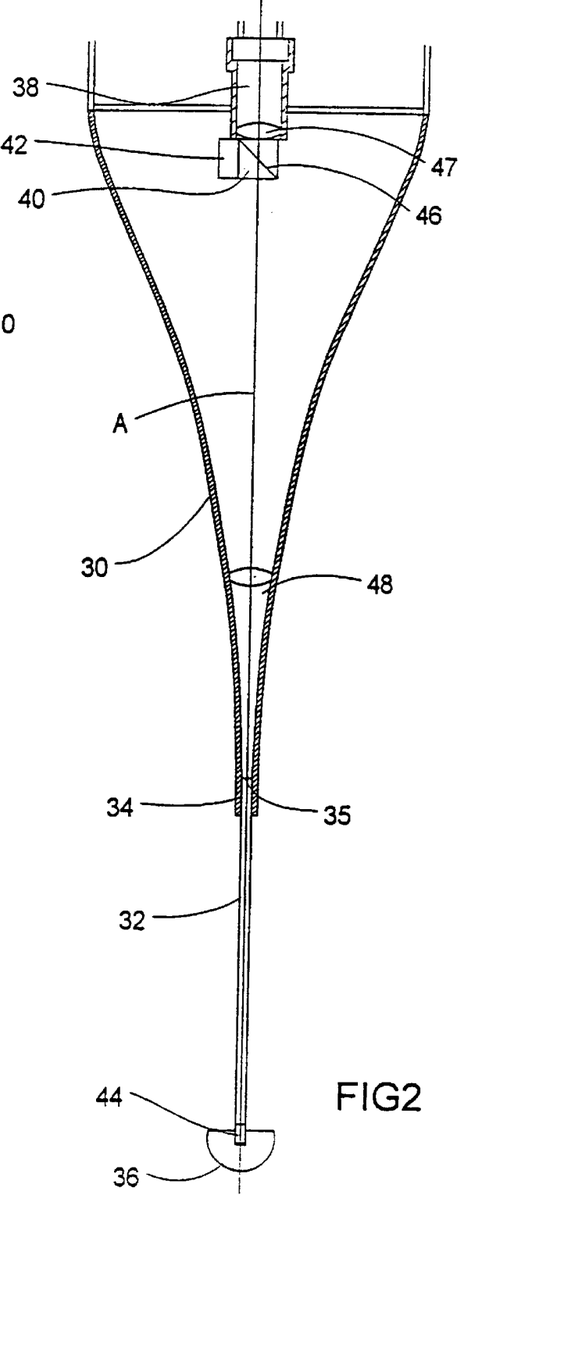
FIG. 2 is a diagrammatic cross-section of the stylus assembly of the surface sensing device of FIG. 1, illustrating the major components of the optical sensing system.

Referring now to FIG. 2 the stylus assembly 22 includes a stylus carrier 30 which is made in the shape of a trumpet with curved side walls to ensure that it has a high stiffness to weight ratio. It may however have other shapes for example a cone or double cone shape depending on the scanning operation the sensing device is to perform, or for ease of manufacture. The stylus carrier may be made from any suitable lightweight material, but to provide good stiffness to weight ratio a carbon fibre material is preferred. The curved shape also provides for good access into bores, and as an example the trumpet shape is designed so that the stylus can get to the bottom of any bores having a length to diameter ratio of four or less.

At the unsupported narrow end of the trumpet a hollow stylus 32 is fitted. The stylus has for example, a part-spherical workpiece contacting tip 36 at its free end. The tip is part spherical to minimise its mass but could be any other suitable shape e.g. spherical. The stylus is hollow and has a high length to diameter ratio to ensure that it is relatively more flexible than the stylus carrier. This ensures that when the tip of the stylus is brought into contact with a workpiece surface, even with only a relatively moderate tip force, the stylus tip will be laterally displaced relative to the stylus carrier due primarily to bending of the stylus and any bending of the stylus carrier will be relatively insignificant.

The stylus may be connected to the stylus carrier with its longitudinal axis aligned with the axis A of the stylus carrier by any convenient means, but in this embodiment the preferred method is a screw-threaded connection 34 at the open end 35 of the stylus to facilitate changing of the stylus.

The optical sensing system consists of a laser 38, a beamsplitter 40, a detector 42 and an optical component 44 at the tip of the stylus.

The laser 38 may be of any suitable type. We have found a vcsel laser manufactured by Honeywell under the designation HFE 4080-321 to be satisfactory. The laser is positioned at the opposite end of the stylus carrier to the stylus where the stylus carrier is supported on the housing 16 of the head (see FIG. 3 for details), and directs a beam along the axis A of the carrier towards the optical element 44 in the stylus.

The beamsplitter 40 shown in this embodiment is a standard cube having a reflecting surface 46 at 45° to the axis so that any light returning along the axis A from the optical element 44 will be reflected at right angles to the axis onto the detector 42. However other forms of beamsplitters such as diffraction gratings may be used, and may be placed at other positions relative to the laser.

The detector needs to be able to provide a signal indicative of the position of a light spot falling on it. Suitable detectors are available such as a two-dimensional position sensitive detector (PSD) manufactured by Hamamatsu under the designation S4744, but another suitable form of detector would be a quadrature cell.

The laser, beamsplitter and detector may be supported on the structure within the housing 16 of the articulating head, but preferably as shown, are supported on the stylus carrier. This ensures that any stylus carrier can be used with any head. It also makes it easier to align the laser and the optical component since this can be done during assembly of the stylus carrier. This in turn eases the manufacturing tolerances on the support for the stylus carrier which would otherwise be required to ensure that the optical component of a replacement stylus carrier would line up with the laser beam as accurately as the one being replaced.

Another benefit of the stylus assembly as described is that it allows for a cheap practical way of exchanging the part of the assembly which is most vulnerable to damage, while leaving the beam generator and detector behind. Furthermore, through the screw-threaded connection, the axis of the new stylus remains substantially aligned with the optical axis of the sensor negating the need for re-alignment with the beam generator and detector.

A convex lens 47 is positioned at the output end of the laser 38. The function of this lens is to collimate/focus the laser beam and direct it through the open end 35 of the stylus, towards the optical element. In the preferred embodiment, however, a second lens 48 is provided which, in combination with the lens 47, is arranged to produce a focused spot at the plane of the open end of the stylus after the beam has been reflected by the optical component 44. This assists in controlling the displacement and size of the spot on the detector 42.

Figure 3:
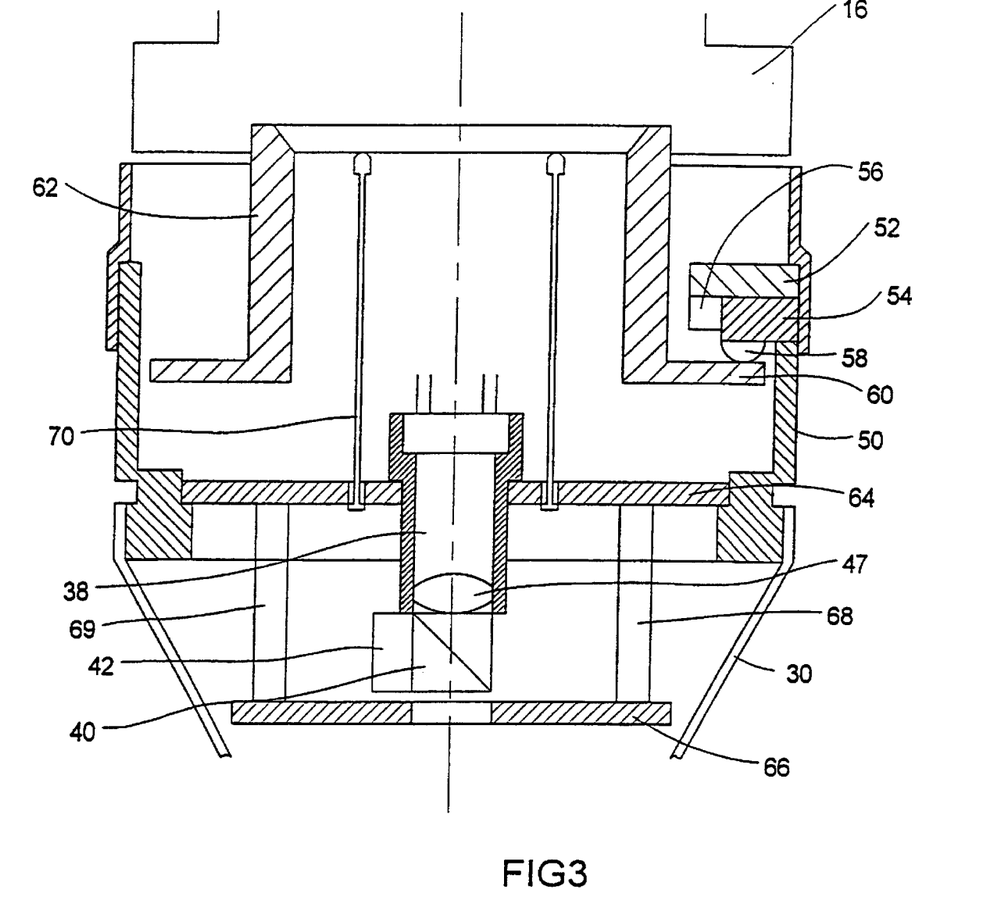
FIG. 3 is a cross-sectional elevation of part of the surface sensing device showing detail of the support structure and the optical components which are mounted thereon.

FIG. 3 shows in greater detail the way in which the surface sensing device is supported on the rotatable housing 16 of the head.

The stylus carrier 30 is connected by any suitable means, e.g. by bonding, to one end of a cylindrical extension 50 for attachment to the base of the rotatable housing 16. At its other end the extension 50 has three radially extending legs 52 which are positioned 120° apart and each of which has only a short circumferential length.

On each leg 52, only one of which can be seen in the drawing, are bonded a single radially extending roller 54, and two magnets 56, one on either side of the roller. The rollers are dimensioned to rest in the space between a pair of balls 58 positioned on a radially outwardly extending flange 60 of a cylindrical support member 62 carried by the rotatable housing 16. This balls and rollers combination forms a conventional kinematic support for the stylus carrier on the housing.

The flange 60 has three cut-away portions, one adjacent each pair of balls 58, and each of which is slightly larger than the circumferential length of the legs 52. This enables the stylus carrier to be positioned on the housing 16 in the manner of a bayonet joint by passing the legs through the cut-out portions and rotating the stylus carrier until the rollers can be seated between the balls. The magnets are positioned to provide a magnetic force which urges the rollers into contact with the balls, but against which the rollers can be unseated from the balls if an excessive force is applied to the stylus. If desired, the balls can be wired into an electrical circuit to provide, in known manner, a signal to indicate that the rollers have been unseated.

The laser, beamsplitter and detector of the optical sensing system are mounted on a base plate 64 of the extension 50, and are therefore in a fixed position relative to the displaceable stylus tip. A circuit board 66 is also supported on the base plate by means of three pillars 68, 69, only two of which are shown. The circuit board carries some of the electronics required by the optical sensing system and is electrically connected (by means not shown) to spring loaded contact pins 70 which carry electrical signals from the stylus carrier to the housing 16.

Referring now to FIGS. 4a to 4e, various designs of optical components 44 are shown in position in the stylus 32.

Figure 4A:
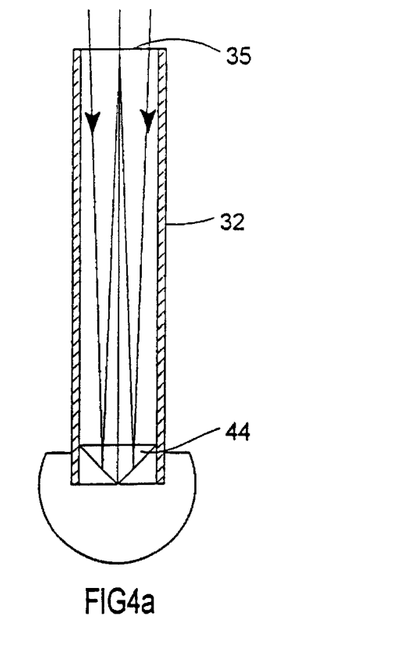
FIGS. 4a to 4e show alternative forms of optical components at the stylus tip.
Figure 4B:
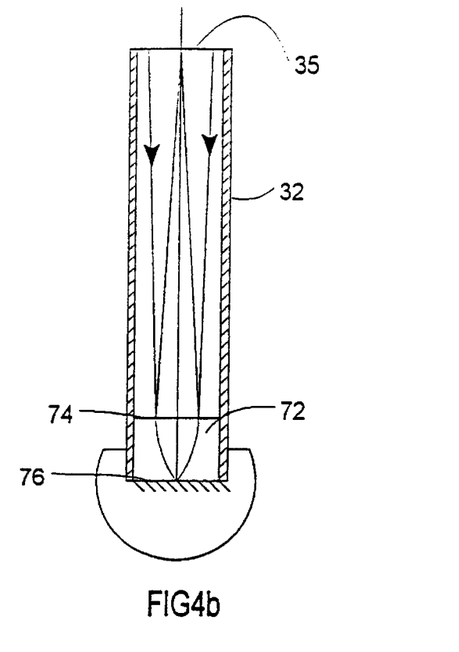
Figure 4C:
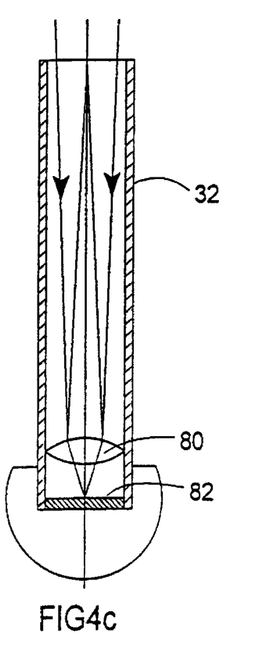

FIGS. 4a to 4c show optical components suitable for use with a stylus assembly having a relatively stiff stylus carrier and a relatively flexible, small diameter stylus. Bending of the stylus gives rise to tilting of the stylus tip as well as a lateral displacement. The effect of this on a plane reflecting element at the stylus tip would be to tilt the reflected light, and in a stylus of the small diameter required of the embodiment described above, such tilting could cause the reflected light to impinge on the internal wall of the stylus. Thus each of the optical components shown has an optical axis aligned with the axis of the stylus and the sensing system measures the displacement of the optical axis of the component.

Thus the optical components shown in FIGS. 4a to 4c in accordance with a novel feature of the invention, are designed to have essentially retro-reflecting properties such as to make them substantially insensitive to tilting of the stylus tip. The embodiments shown in FIGS. 4d and 4e however, are more susceptible to tilting of the stylus tip.

A common feature of all of the embodiments shown in FIGS. 4a to 4e is that the light beam from the lens 48 is focused towards a point which lies beyond the stylus tip at a distance from the centre of the stylus ball which is substantially equal to the length of the stylus.

Figure 4D:
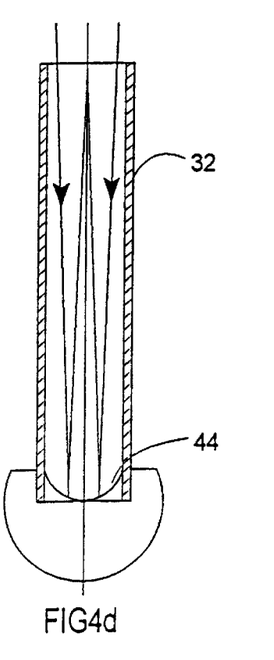
Figure 4E:
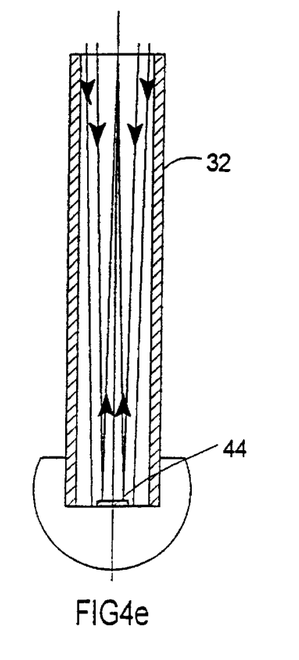

This has the effect that the optical component 44 in each case reflects the beam to a spot substantially in the plane of the open end 35 of the stylus. This allows for the maximum amount of lateral displacement of the spot to take place before the reflected light impinges on the internal wall of the stylus, which is particularly beneficial for embodiments 4d and 4e.

Another novel feature of these embodiments is that the reflecting element of the optical component 44 can be placed very close to the centre of the stylus ball, and thus substantially measures the actual displacement of the stylus tip centre.

In FIG. 4a the optical component 44 is shown as a corner cube retro-reflector positioned with its apex as close a possible to the centre of the stylus tip. This ensures that the sensing system measures the displacement of the centre of the stylus tip. The converging light beam from lens 48 impinges on the sides of the corner cube and each part of the beam crosses the optic axis through the apex of the cube and is reflected back parallel to itself but displaced laterally. The result is that the returning beam continues to converge. The combination of the lens 48 and the corner cube 44 is arranged to ensure that the returning beam is focused to a small spot substantially at the plane of the open end 35 of the stylus before returning to the lens 48, which directs it via the beamsplitter 40 onto the detector 42.

The low sensitivity of the reflected beam to tilting of the corner cube as the stylus bends makes this form of optical component ideally suited for the sensor, enabling substantially only lateral displacements of the stylus ball to be measured by the detector. However, the practical difficulties of miniaturising a retro-reflector to enable it to fit inside the smallest diameter stylus may be difficult to overcome.

FIG. 4b shows an alternative form of optical component which has retro-reflecting properties and is easier to produce at the required size. In this embodiment the optical component 44 is a graded refractive index (GRIN) lens 72 having a first surface 74 for receiving an incoming light beam and a second, reflecting surface 76, for reflecting the received light. The lens is placed at the end of the stylus at which the stylus tip is fitted, and with its reflecting surface facing lens 48. Once again the relative positions of the stylus tip and the optical component are adjusted during assembly so that the reflecting surface is positioned as nearly as possible to the centre of the stylus tip.

The convergent light beam from the lens 48 impinges on the top surface 74 of the GRIN lens and passes through the lens to converge onto the reflecting surface 76 which returns the beam towards lens 48. Once again the lens 48 and the optical component co-operate to focus the light beam to a small spot at the plane of the open end of the stylus before the beam returns through lens 48 to the detector.

The combination of the GRIN lens and reflector has the property of being substantially unaffected by tilting of the stylus tip so that the output from the detector gives an accurate measure of the lateral displacement of the centre of the stylus tip.

FIG. 4c shows an optical component which has retroreflecting properties and which may also be easier to produce at the required size. In this embodiment the optical component 44 is a combination of a convex lens 80 and a plane reflecting surface 82 positioned at the centre of the stylus tip. This combination of elements has similar retroreflecting properties to the corner cube in that, each part of the convergent light beam from lens 48 will be reflected back parallel to itself, and the result is that the beam is focused to a spot in the plane of the open end of the stylus before returning to the lens 48 and the detector 42.

The embodiments 4a to 4c have described an optical sensing system for use with a relatively stiff stylus carrier and a relatively flexible stylus. The optical systems described use a beam from the lens 48 which is converging during its passage along the stylus (to a point beyond the stylus tip). The optical components 44 however, all have a diameter substantially equal to the internal diameter of the stylus. This means that at the plane at which the converging beam impinges on the optical component 44 the width of the beam is less than the width of the optical component. This has the effect that the lateral displacement of the returning beam will be greater than the lateral displacement of the stylus tip which increases the sensitivity of the sensing system compared to using a collimated beam of light from lens 48 which is greater than the internal diameter of the stylus.

In a refinement to the embodiment shown in FIG. 4c the convex lens may be an aspheric lens to reduce any aberrations in the shape of the spot on the detector and to provide high linearity of the detector signal.

FIGS. 4d and 4e show other possible embodiments which will produce signals related to lateral displacement of the stylus but are less effective than the preferred embodiments shown in FIGS. 4a to 4c because, with the reflectors, shown the return beam is affected by tilting of the reflector as well as lateral movement.

In FIG. 4d the optical element 44 is a concave mirror which is mounted at the stylus tip with its concave surface facing towards the lens 48 and shaped to focus the beam from lens 48 to a minimum diameter at the entry plane 35 of the stylus. Lateral movement of the stylus tip will cause lateral movement of the return beam, but the tilting of the mirror due to the bending of the stylus will affect the amount of lateral movement of the return beam and the position of the spot on the detector.

FIG. 4e shows an embodiment in which the reflecting element 44 is a plane mirror. In this embodiment the plane mirror is of limited aperture, that is, it is of significantly smaller diameter than the illuminating beam. This enables the plane mirror to sense lateral displacement at the stylus tip, but again the tilting of the plane mirror due to stylus bending will affect the position of the spot on the detector 42.

In an alternative embodiment, where the diameter of the stylus allows, the optical component 44 is a plane mirror and the laser beam is arranged to be convergent and focused to a spot on the detector after reflection from the plane mirror. This embodiment makes use of the tilting of the reflector to deflect the spot on the detector laterally, and benefits from the magnification of the spot movement compared to the angle of tilt due to the distance of the detector from the reflector to enhance the sensitivity of the system.

The optical sensing system may take other forms within the scope of the invention. For example, the optical component at the stylus tip may be dispensed with and the system may simply use a light source at one end of the stylus assembly which directs a light beam to form a spot on a position sensitive detector at the other end. Such embodiments however, require electrical connections to be provided to the component at the stylus tip.

Various advantages of the above-described preferred embodiments are:

1) A relatively stiff lightweight stylus assembly with controlled deflection near the tip.
2) Simple lightweight optical system which measures lateral displacement of the stylus tip substantially at the tip with high frequency response and accuracy. This allows for larger stylus deflection and thus lower scanning torque and high speed servoing capability.
3) single optical component on the stylus axis at the tip makes for lower cost styli and interchangeability of styli with minimal re-calibration.
4) applicability to stylus assemblies with high length to diameter ratios and small diameter styli for example approximately 1 mm diameter.

What is claimed is:

1. A surface sensing device for use in position determining apparatus and which includes a hollow stylus having a workpiece-contacting tip and an optical transducer system, said optical transducer system comprising a light source for producing a beam of light directed internally of the stylus towards the tip of the stylus, an optical component mounted adjacent the tip of the stylus to return the beam, and a detector positioned relative to the returned beam to receive the beam and to produce a signal indicative of a lateral displacement of the stylus tip, wherein the optical component is a retro-reflecting device which is substantially insensitive to tilting of the stylus tip.

2. A surface sensing device according to claim 1 wherein the light source and the detector are mounted to fixed structure to which the stylus is connected.

3. A surface sensing device according to claim 1 wherein the stylus forms part of a stylus assembly which comprises a relatively stiff stylus carrier and a relatively flexible stylus.

4. A surface sensing device according to claim 3 wherein the stylus carrier is connected to a housing of the device and the light source and detector are mounted to the housing.

5. A surface sensing device for use in position determining apparatus and which includes a stylus having a workpiece-contacting tip and an optical transducer system, said optical transducer system comprising:

a light source for producing a beam of light directed internally of the stylus towards the tip of the stylus;

an optical component mounted adjacent the tip of the stylus to return the beam, wherein lateral displacement of the stylus tip causes a corresponding lateral displacement of the returned beam; and a detector positioned relative to the returned beam to receive the beam and detect an amount of lateral displacement thereof, the detector providing a signal indicative of the position of a light spot falling on the detector which is produced by the returned beam, said signal thereby indicating the amount of lateral displacement of the stylus tip.

6. The surface sensing device according to claim 5, wherein the detector indicates the lateral displacement of the returned beam in two dimensions.

7. The surface sensing device according to claim 5, wherein the optical component reflects the returned beam to a focused spot.

8. The surface sensing device according to claim 7, wherein the spot lies substantially at an end of the stylus remote from the workpiece-contacting tip.

9. The surface sensing device according to claim 5, wherein the light source and the detector are mounted to fixed structure to which the stylus is connected.

10. The surface sensing device according to claim 5, wherein the optical component is a retro-reflecting device which is substantially insensitive to tilting of the stylus tip.

11. The surface sensing device according to claim 5, wherein the stylus forms part of a stylus assembly which comprises a relatively stiff stylus carrier and a relatively flexible stylus.

12. The surface sensing device according to claim 11, wherein the stylus carrier is connected to a housing of the device and the light source and detector are mounted to the housing.

13. The surface sensing device according to claim 5, including a focusing element which receives the returned beam and directs it onto the detector.

14. The surface sensing device according to claim 1, wherein the detector indicates the lateral displacement of the returned beam in two dimensions.

15. The surface sensing device according to claim 1, wherein the optical component reflects the returned beam to a focused spot.

16. The surface sensing device according to claim 1, wherein the spot lies substantially at an end of the stylus remote from the workpiece-contacting tip.

17. The surface sensing device according to claim 1, including a focusing element which receives the returned beam and directs it onto the detector.

* * * * *

UNITED STATES PATENT AND TRADEMARK OFFICE
CERTIFICATE OF CORRECTION

| | |
|---|---|
| PATENT NO. | : 6,633,051 B1 |
| APPLICATION NO. | : 09/701699 |
| DATED | : October 14, 2003 |
| INVENTOR(S) | : Alan James Holloway, Kevyn B. Jonas and David A. Wright |

It is certified that error appears in the above-identified patent and that said Letters Patent is hereby corrected as shown below:

Column 8, line 12 (claim 1, lines 11-22), the word "hollow" should be deleted.

Please delete:
1. A surface sensing device for use in position determining apparatus and which includes a hollow stylus having a workpiece-contacting tip and an optical transducer system, said optical transducer system comprising a light source for producing a beam of light directed internally of the stylus towards the tip of the stylus, an optical component mounted adjacent the tip of the stylus to return the beam, and a detector positioned relative to the returned beam to receive the beam and to produce a signal indicative of a lateral displacement of the stylus tip, wherein the optical component is a retro-reflecting device which is substantially insensitive to tilting of the stylus tip.

Replace with:
1. A surface sensing device for use in position determining apparatus and which includes a stylus having a workpiece-contacting tip and an optical transducer system, said optical transducer system comprising a light source for producing a beam of light directed internally of the stylus towards the tip of the stylus, an optical component mounted adjacent the tip of the stylus to return the beam, and a detector positioned relative to the returned beam to receive the beam and to produce a signal indicative of a lateral displacement of the stylus tip, wherein the optical component is a retro-reflecting device which is substantially insensitive to tilting of the stylus tip.

Column 10, line 4 (claim 16, lines 4-6), "claim 1" should read "claim 15".

Please delete:
16. The surface sensing device according to claim 1, wherein the spot lies substantially at an end of the stylus remote from the workpiece-contacting tip.

UNITED STATES PATENT AND TRADEMARK OFFICE
CERTIFICATE OF CORRECTION

| | | |
|---|---|---|
| PATENT NO. | : 6,633,051 B1 | Page 2 of 2 |
| APPLICATION NO. | : 09/701699 | |
| DATED | : October 14, 2003 | |
| INVENTOR(S) | : Alan James Holloway, Kevyn B. Jonas and David A. Wright | |

It is certified that error appears in the above-identified patent and that said Letters Patent is hereby corrected as shown below:

Replace with:
16. The surface sensing device according to claim 15, wherein the spot lies substantially at an end of the stylus remote from the workpiece-contacting tip.

Signed and Sealed this

Twenty-first Day of July, 2009

JOHN DOLL
*Acting Director of the United States Patent and Trademark Office*